FIG. 1.

G. A. BERTSCH.
REVERSIBLE ROTARY MOTOR.
APPLICATION FILED NOV. 16, 1915.

1,263,639.

Patented Apr. 23, 1918.
8 SHEETS—SHEET 3.

Fig. 3.

Witnesses

Inventor
G. A. Bertsch
By
Attorney

G. A. BERTSCH.
REVERSIBLE ROTARY MOTOR.
APPLICATION FILED NOV. 16, 1915.

1,263,639.

Patented Apr. 23, 1918.
8 SHEETS—SHEET 8.

Inventor
G. A. Bertsch.

Witnesses

UNITED STATES PATENT OFFICE.

GEORGE A. BERTSCH, OF PROVIDENCE, RHODE ISLAND.

REVERSIBLE ROTARY MOTOR.

1,263,639.  Specification of Letters Patent.  Patented Apr. 23, 1918.

Application filed November 16, 1915. Serial No. 61,797.

*To all whom it may concern:*

Be it known that I, GEORGE A. BERTSCH, a citizen of the United States, residing at Providence, in the county of Providence and State of Rhode Island, have invented certain new and useful Improvements in Reversible Rotary Motors; and I do hereby declare the following to be a full, clear, and exact description of the invention, such as will enable others skilled in the art to which it appertains to make and use the same.

This invention relates to new and useful improvements in reversible rotary motors and the principal object of the invention is to provide a motor adapted for use in connection with fluid under pressure to transfer the expansive power of the fluid into rotary power which may be utilized to drive various kinds of machinery.

Another object of the invention is to provide a rotary motor which will allow the use of high heats of gaseous vapors, air, or steam, or fuel in the act of combustion, without necessitating the lubricating of moving parts within the channels traversed by said highly heated gaseous vapors, air, or steam, the motor being constructed in such a way as to allow a slight space, say, from .002" to .010" between the stationary and revolving parts of the motor beyond the rim of the rotor and between the walls of the channels of the stator. Moreover these parts of the stator and rotor beyond the rim of the rotor may become red hot under the heat permissible, the idea being not to cool these parts more than to prevent these parts from losing their form. This will bring the motor to the highest efficiency attainable and is perfectly practicable, the surfaces under pressure being comparatively small, also the parts subject to red heat may be made more heavy or of cast steel, provided with rips or double walls.

Another object of the invention is to provide a device in which the heat going to waste otherwise is absorbed through the medium of water or steam, this water or steam equalized at the pressure prevalent at the point of admittance into the device, after passing through the several heating appliances being admitted to the device at a point where the heat of the gases passing through the device is sufficiently high to transform this hot water or steam into superheated steam thereby further increasing the power and efficiency of the device.

Still another object of the invention is to provide a novel means for feathering the pistons during their passage around the interior of the stator so as to permit the same to pass through the openings in the walls of the various expansion chambers.

Still another object of the invention is to provide a compound motor in which there is provided a high pressure and low pressure expansion chamber or chambers and in which there is provided a high and low pressure rotor, each of which carries a plurality of feathering pistons.

Still another object of the invention is the provision of a novel form of cam for each of the high and low pressure chambers which is arranged to properly time the feathering of the pistons in order to avoid any possibility of their interference with the webs or walls of the chambers.

Still another object of the invention is to provide a simple and compact motor, the stator of which consists of a pair of annular passages of different sizes and a pair of connected rotors of different sizes, the rotors being adapted to fit within the stators and the stators being provided with communicating passages, the inlet passages, being in communication with the smallest stator while the outlet passage is connected to the larger, thereby increasing the area of activity of the fluid as the expansive power thereof is reduced.

With these and other objects in view, the invention consists in the novel combination and arrangement of parts as will be fully set forth in the following specification and accompanying drawings, in which:—

Fig. 2ª is a sectional view on line 2ª—2ª of Fig. 1.

Fig. 9ª is an inverted fragmentary perspective view of the lower end of one set of piston shanks.

Referring to the drawings, 1 designates as an entirety the high pressure cover of the stator which comprises a disk 2 formed with the hub portion 3 which is arranged centrally thereof. This disk is provided at its periphery with a flange 4 having formed at its outer edge a wall 5 which coöperates with the inturned flange 6 having at its inner edge an offset portion 7 provided with a flange 8. This flange 8 is provided with a plurality of openings for the reception of suitable attaching bolts by means of which the cover 1 is secured to the central portion of the stator. Formed centrally of the hub portion 3 is a suitable bore 9 in which the shaft of the motor is mounted. A suitable end closure 10 is formed for the bore 9 and provides a lubricant receiving chamber at the end of the shaft as clearly shown in Fig. 2. A suitable pressure inlet pipe 11 is connected to the device and communicates with the annular passage 12 formed by the flanges 4 and 6 and the wall 5. The offset portions 7 coöperate with the end of the wall 6 in forming an annular groove 8 in which the heads of the pistons of the rotor operate. A suitable groove 14 is formed in the hub portion 3 surrounding the bore 9 and is adapted to receive suitable packing rings which will be more fully hereinafter described. Formed at diametrically opposite points on the plate 1 and at 90 degrees from the inlet opening is an offset portion forming a pocket 15, the use of which will appear as the description proceeds.

Figure 1:
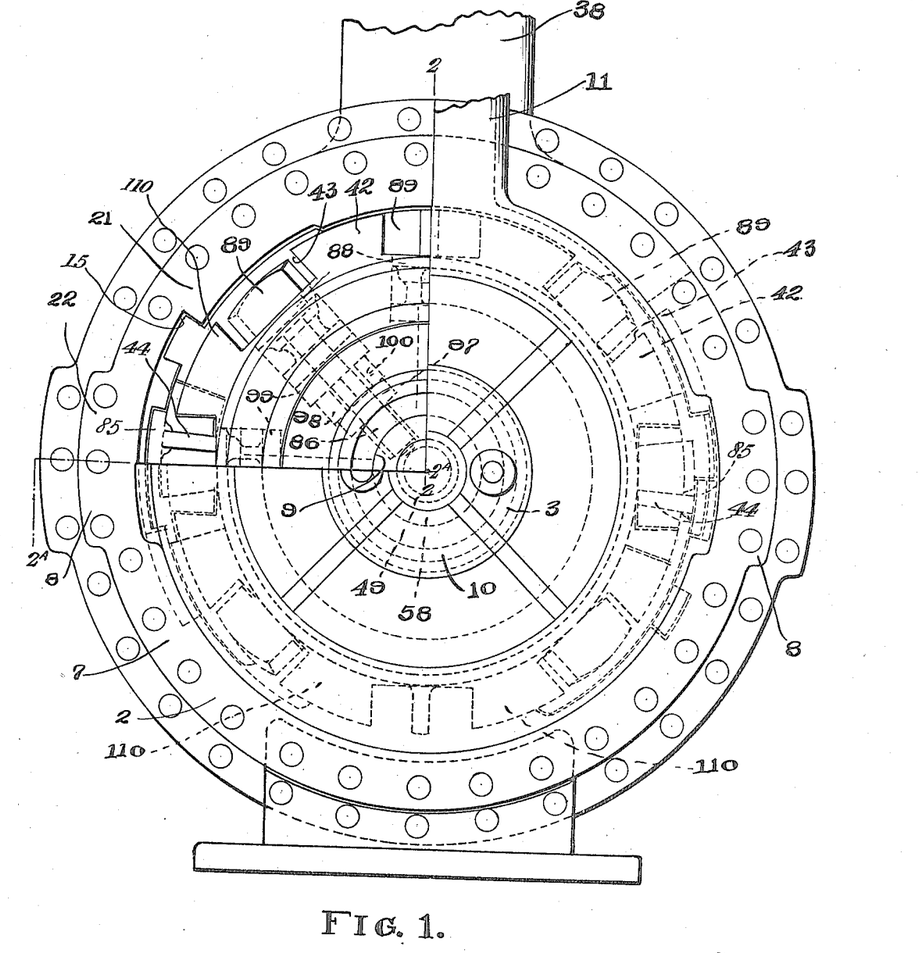
Figure 1 is a side elevation of this improved motor.
Figure 2:
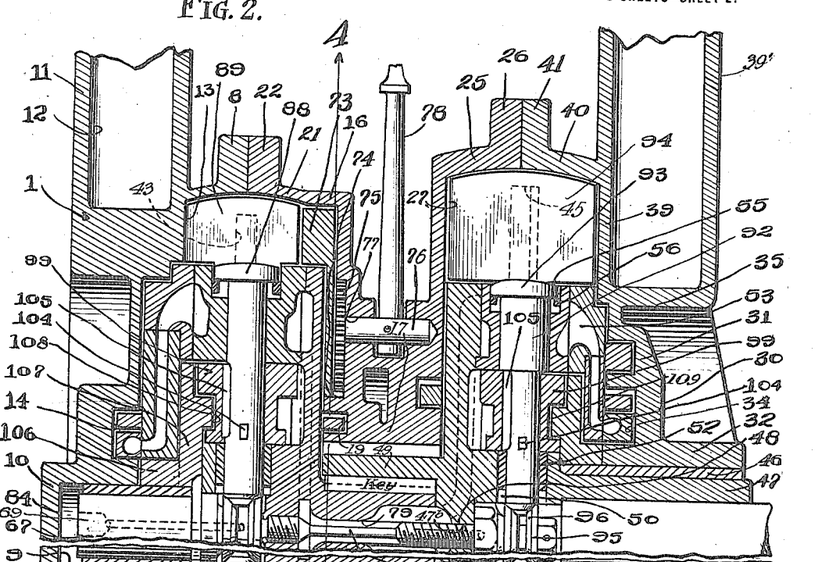
Fig. 2 is a vertical sectional view on line 2—2 of Fig. 1.
Figure 2A:
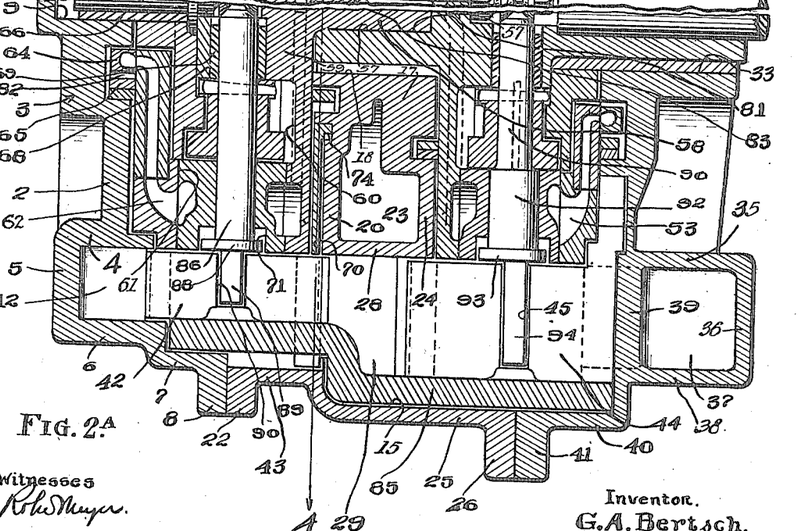
Figure 3:
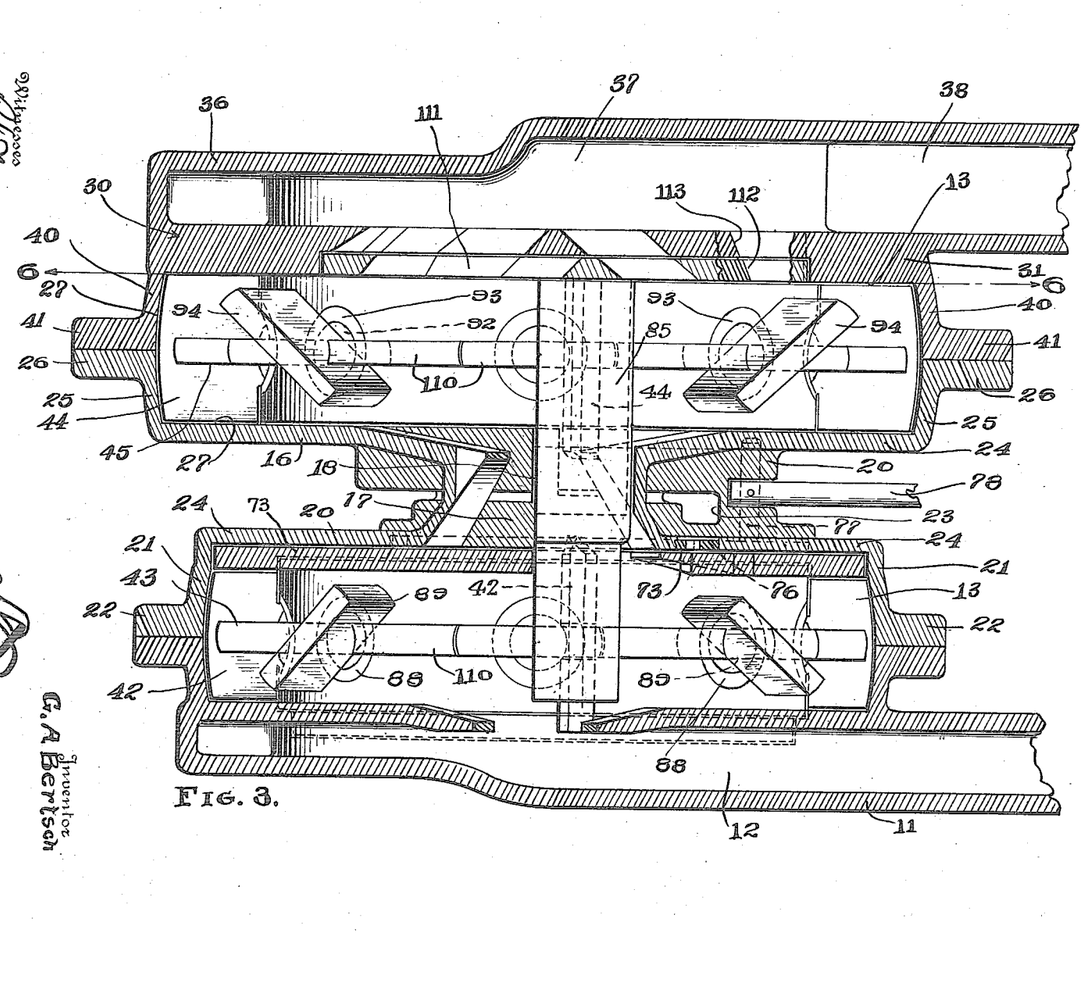
Fig. 3 is a sectional view illustrating the rotors in elevation.
Figure 4:
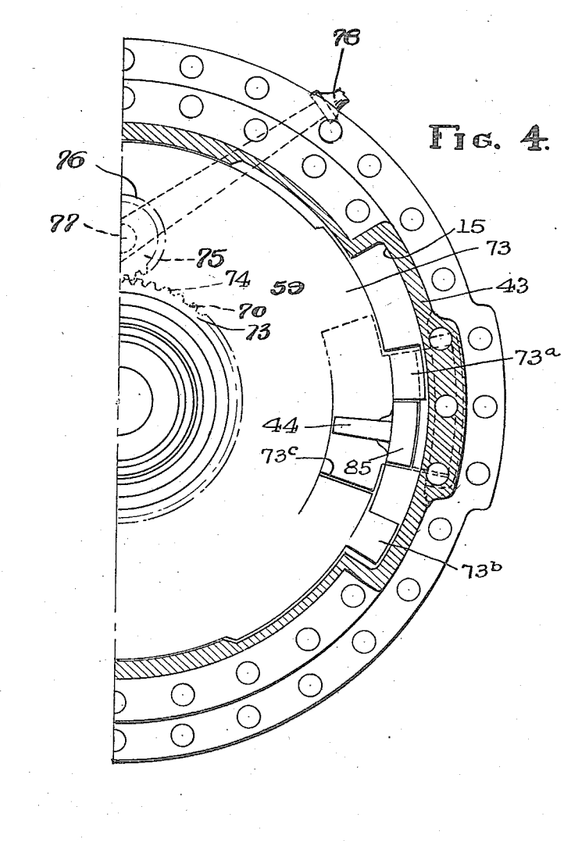
Fig. 4 is a view partly in section on line 4—4 of Fig. 2.
Figure 5:
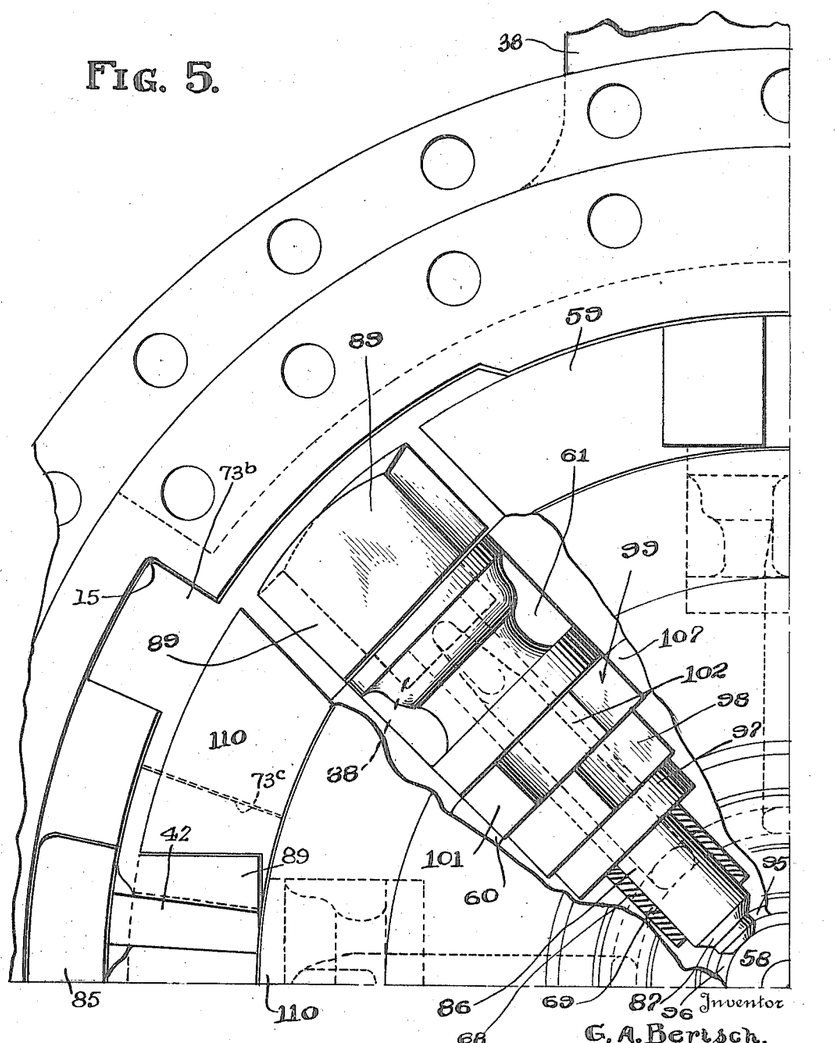
Fig. 5 is a fragmentary view of a portion of the motor illustrating parts broken away to more clearly illustrate the details of construction.
Figure 6:
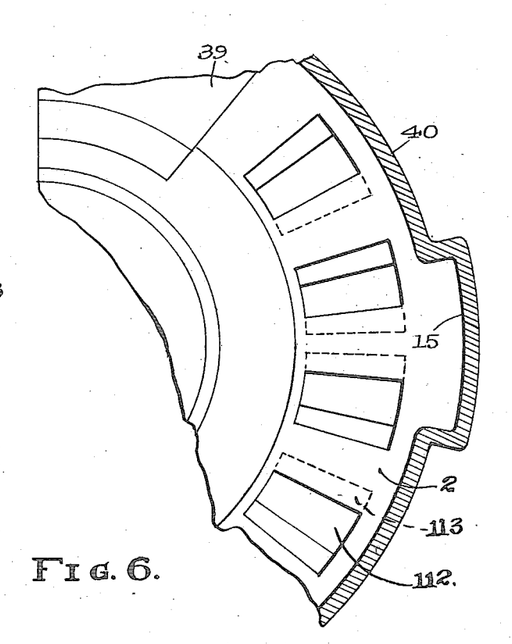
Fig. 6 is an enlarged fragmentary view on line 6—6 of Fig. 3.
Figure 7:
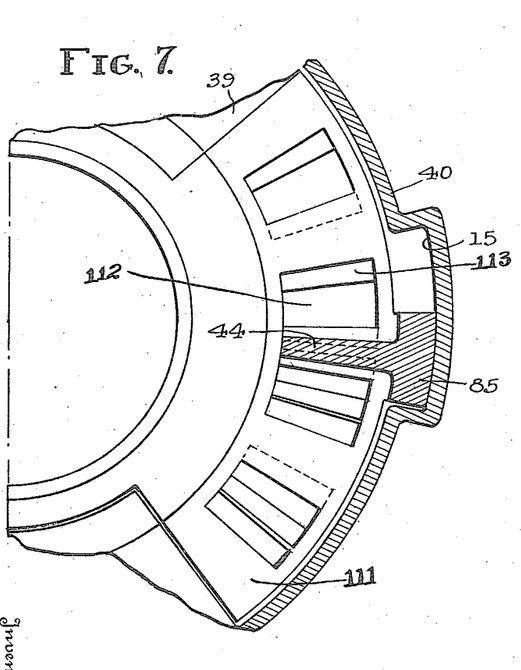
Fig. 7 is a view similar to Fig. 6 showing the valve plate removed.
Figures 8, 9, 14:
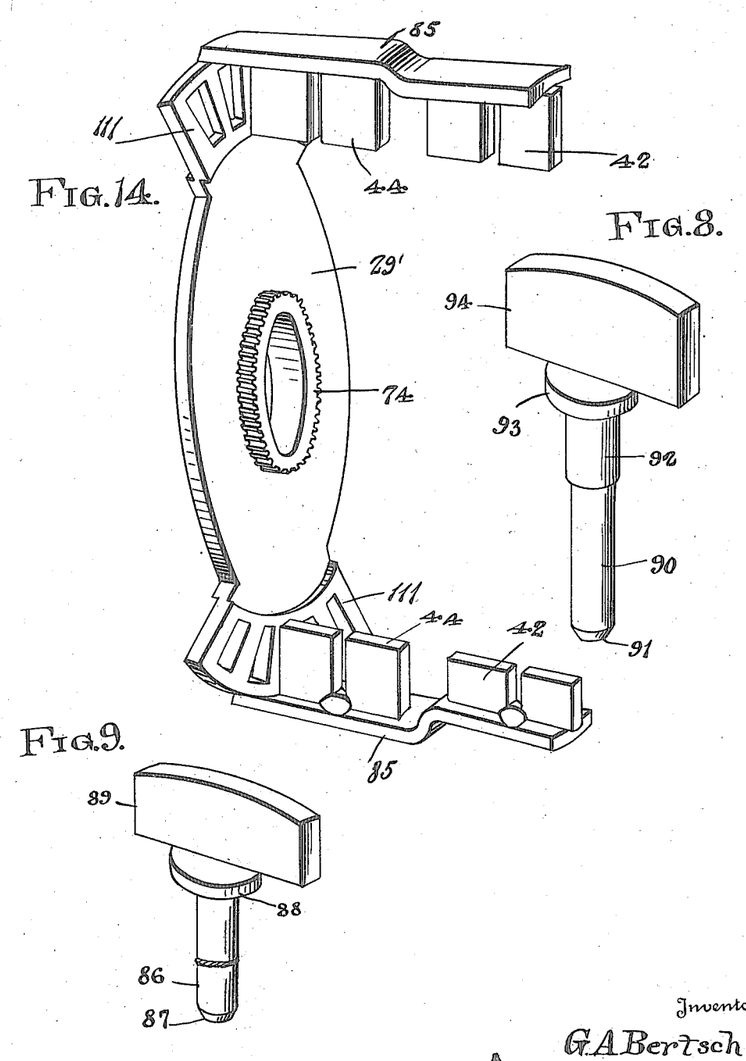
Fig. 8 is a detail perspective view of the low pressure piston.
Fig. 9 is a detail perspective view of the high pressure piston.
Fig. 14 is a detail perspective view of the reversing vane.
Figures 9A, 10:
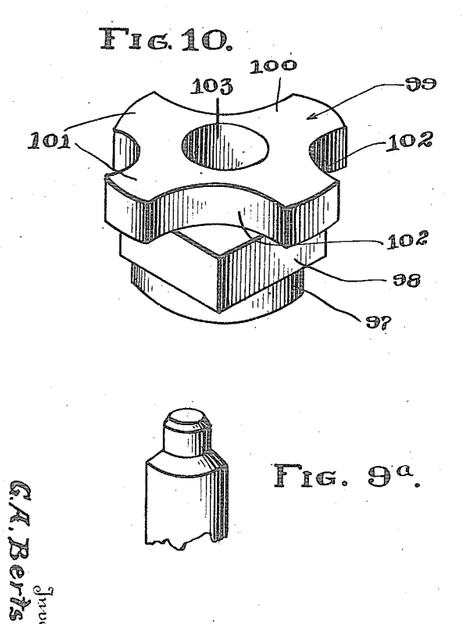
Fig. 10 is a detail perspective view of the movable cam.

The central portion of the stator is designated generally by the numeral 16 and comprises a central hub portion 17 formed with a central opening 18 through which the shaft of the device extends. A suitable annular groove 19 is formed in the hub portion and alines with the groove 14 when the device is in assembled position and is adapted to receive a suitable packing ring. The hub portion is provided at its periphery with a circular wall 20 which extends in such a manner that its outer face lies flush with one face of the hub portion as clearly illustrated in the drawings. A flange 21 is formed at the periphery of the wall 20 and is provided with the attaching flange 22 which coöperates with the flange 8 and is provided with suitable openings which aline with the openings in said flange 8 to receive attaching bolts by means of which the high pressure cover plate is held in place on the central portion of the stator. The hub is formed with a water circulating chamber 23 for the reception of the cooling liquid by means of which the temperature of the device is kept within the limit. This cooling chamber extends annularly around the central opening 18 as clearly illustrated in the drawings. Formed on the edge of the hub opposite that on which the wall 20 is formed is a wall 24 which is of greater diameter than the wall 20 and is provided at its periphery with a flange 25 having a flange 26 formed at the extreme outer edge thereof. This flange 26 is provided with suitable openings for the reception of bolts by means of which the low pressure cover plate is held in place. The wall 24 and the flange 25 coöperate with the low pressure cover plate in forming an annular chamber in which the low pressure pistons operate. This chamber is designated by the numeral 27 as shown in Fig. 2. A connecting wall for the peripheries of the walls 20 and 24 is provided and designated by the numeral 28 and this wall coöperates with a connecting web of the pocket 15 and forms the passage 29, the use of which will appear as the description proceeds.

The high pressure cover plate of the device is designated generally by the numeral 30 and comprises a circular wall 31 provided with the hub portion 32 which alines with the hub portions 3 and 17 of the high pressure cover plate and the central portion of the stator and is adapted to receive the drive shaft. This hub portion 32 is provided with a bore 33 for the reception of the bearing bushing for said shaft while the body 31 is formed with an annular groove 34 for the reception of suitable packing rings. An outwardly extending flange is formed adjacent the periphery of the wall 31 and is designated by the numeral 35 and has formed integrally therewith at its outer edge a wall 36 which in turn is provided with an inturned wall 38 joining the wall 39 and forming an annular passage 37 which communicates with the exhaust pipe 39'. The inner face of the wall 39 sets inwardly for a short distance toward the central portion of the rotor and this wall is provided at its outer edge with a flange 40 having a flange 41 formed at its extreme edge which coöperates with a flange 26 and is formed with suitable openings for the reception of the bolts by means of which the low pressure cover plate is attached to the flange 26. As shown in the drawings the annular passages 13 and 27 are joined at diametrically opposite points by the transverse passages 29 thus enabling the gas passing from the high pressure side of the device to enter the low pressure side. The pockets 15 are provided to accommodate the base plates of the reversing vanes which will be more fully hereinafter described.

Formed at spaced intervals within the passage 13 are the stationary vanes 42 which are spaced from each other by suitable slots 43 which are of a width to accommodate the heads when the same are turned longitudinally of the rotor. The chamber 27 is also formed with suitable webs or vanes 44 which are separated by a slot 45. These heads form walls against which the hot gases expand when the device is in operation. A suitable bearing bushing 46 is secured within the bore 33 and forms a bearing for the hub portion 47 of one end of the rotor. The rotor comprises the hub portion 47 formed with a circular body 48 from the center of one side of which the hub portion extends while the center of the opposite side of said circular body is formed with a suitable hub 49 into which the hollow stud of the coöperating rotor element extends. The body of the low pressure side of the rotor is provided with a plurality of radial openings which extend to the periphery thereof and are designated by the numeral 50. The inner terminals of these openings are reduced as at 50ª and formed in the body intermediate the openings 50 and 50ª is an annular groove 51 which opens out through one side of the rotor as clearly illustrated in Fig. 2. Suitable bushings 52 are fitted in the bores 50ª and formed at spaced intervals within the device are suitable passages 53 for receiving the cooling liquid. The hub portions 47 and 49 are each formed with the openings 47ª and 57 and a reduced bore 47ᵇ establishes communication between the bores as clearly shown in the drawings. The bore 57 receives the hub portion 58 of the high pressure rotor section which is keyed to the low pressure rotor member as clearly illustrated in Fig. 2. The high pressure rotor member comprises the hub 58 provided with the body 59 formed with an annular groove 60 and a plurality of radiating openings 61, the inner ends of which are reduced and receive the bushings 69 through which the piston stems are rotatable. This rotor element like the one previously described is provided with the water passages 62 for receiving the cooling liquid.

Suitable bushings 68 are fitted in the reduced bores in the body 59 of the high pressure rotor and form bearings for the reception of the spindles or shanks of the high pressure pistons which will be more fully hereinafter described.

Fitted in the end of the high pressure rotor opposite that on which the hub 58 is formed is a trunnion 69 which is rotatably mounted in a bushing 66 fitted in the socket formed by the bore 9 in the hub portion of the cover plate on the high pressure side of the stator. The bushing 66 supports the hub 106 of the plate 107 which is formed with an annular series of cams 108 on its inner face as will be clearly seen upon reference to the drawings. A similar plate provided with a similar hub is supported on the inner end of the bushing 46 fitted in the opening 33 on the low pressure side of the stator and like the plate 107 is formed with an annular series of cams 109, the use of which will appear as the description proceeds. Fitted in the outer enlarged ends of the bores in the rotor element are suitable bushings or plugs formed with axial bores which are enlarged at their outer ends as at 71. These plugs form bearings for the outer ends of the stems 86 and 90 of the high and low pressure pistons respectively while the inner ends of said shafts or spindles are rotatably mounted in the bushings 68 and 52 respectively. Keyed or otherwise secured to the spindles are the rotating cams 99 which comprise sleeves 97 formed with the rectangular portions 98, the upper ends of which terminate in a head 100 provided with a plurality of radiating arms 101 which are separated by spaces 102 into which the stationary cams 109 extend. A bore 103 is formed in each of the rotatable cams and is adapted to receive the shank of the piston to which it is connected. The piston shanks 86 and 90 are formed respectively with the heads 89 and 94 which are separated from the shanks respectively by the flanges 88 and 93 which are rotatably mounted within the enlarged bore 71. The heads 89 and 94 project beyond the peripheries of the high and low pressure rotors respectively and travel in the passages 13 and 27 as will be clearly seen upon reference to the drawings.

Rotatably mounted beside the high pressure rotor within the central stator section is a suitable wheel or disk 29 formed with a central opening which is surrounded by an externally toothed collar 74, the teeth of which are adapted to mesh with a pinion 75 mounted at the end of a shaft 76 which is rotatably mounted in a bore 77 formed in the central section of the stator. The gear 75 is rotatable in the pocket at the outer end of the bore and a lever 78 is attached to the shaft 76 so that upon movement of the lever the shaft will be rotated thereby causing the disk 29 to rotate. Former at diametrically opposite points on the disk 29' are suitable arms 85 which are adapted to be received in the pockets 15 of the stator and are formed with the inwardly extending webs 42 and 44 which are located respectively in the high and low pressure passages 13 and 27 respectively. The arms 85 are supported at the peripheries of the extensions 111 formed at diametrically opposite points on the plate 29' and these extensions 111 are formed with openings 112, the end walls 113 of which are inclined so that the direction of flow of gas into the device may be varied to change the direction of rotation of the rotor. Similar inwardly extending extensions are formed at opposite ends of the arms 85 and like the extensions 111 are provided with passages the end walls of which are inclined so that by varying the position of the device the direction of flow of the gases thereinto is controlled.

Suitable packing rings are seated in the various grooves formed in the stator to prevent the escape of fluid from the device and suitable rings or disks are seated against the plate 107 and are formed with passages which communicate with the passages 62 and provide a means for conducting the cooling fluid from the central distributing rings 64 to the bushings in the larger bores of the rotors so as to prevent the heating of the various parts beyond a predetermined point. A suitable chamber 79 is formed centrally of the hub portion 58 and is adapted to communicate with suitable passages formed in the rotors in order to establish a complete circulation of the liquid through the device.

Figure 11:
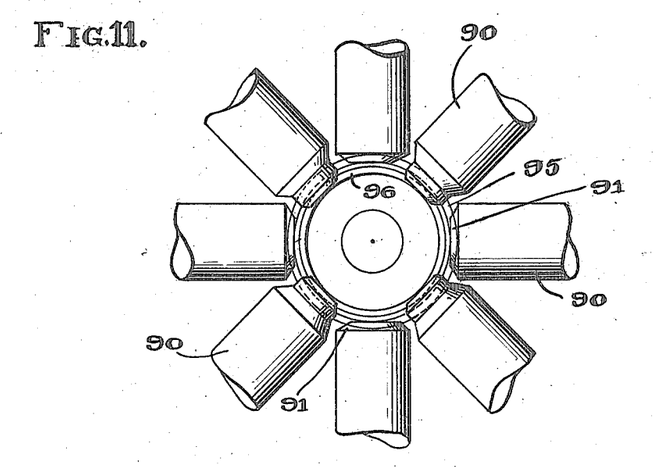
Fig. 11 is a detailed fragmentary side elevation illustrating the method of supporting the pistons.
Figure 12:
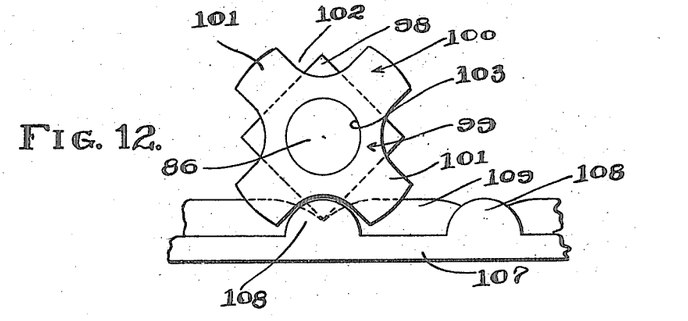
Fig. 12 is a top plan view of the rotary cam illustrating the method of operation in connection with the relatively stationary cam.
Figure 13:
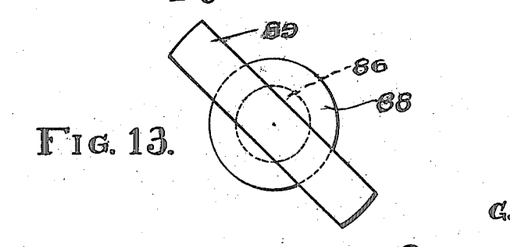
Fig. 13 is a top plan view of one of the pistons.

The extreme inner ends of the stems 86 and 90 are seated on independently rotatable rings so that when one set of pistons revolve the friction at the inner ends will be overcome as clearly illustrated in Fig. 11. A suitable lubricating tube 83 is supported on the cone shaped ends of the threaded plugs 81 which are threaded into bores arranged in axial alinement with the high and low pressure rotors and this tube is adapted to allow lubricant which is placed within the device to pass freely between the two rotating elements.

It will be apparent from the foregoing that the gas under pressure enters the device through the inlet pipe 11 and passing around through the passage 12 and through the openings in the inwardly extending flanges at the ends of the arms in the high pressure side of the device, the gases enter the passage 13 and impinge against the heads 89 which stand transversely of said passage thus causing the device to be set in operation. As the rotors revolve it will be seen that the cams will cause the heads to turn as they approach the transverse webs so that the heads turn edgewise and pass through the openings 43 formed in said webs and after the greater part of the force of the gases has been spent the same are conducted through the openings 112 into the low pressure side of the device where they impinge against the heads 94 which are actuated in the same manner as the heads 89 and the gases are then finally conducted out through the passage 37 into the exhaust pipe 39'.

While in the foregoing there has been shown and described the preferred embodiment of this invention, it is to be understood that such changes may be made in the combination and arrangement of parts as will fall within the spirit and scope of the invention as claimed.

What is claimed is:—

1. In a rotary engine, a stator, slotted heads in said stator, a rotor, pistons carried by said rotor, means to feather said pistons to permit the same to pass through the slots in the heads, and means to change the positions of the heads to reverse the direction of the operation of the engine.

2. In a rotary engine, a stator having an intake and an exhaust port, slotted heads in said stator, a rotor, pistons carried by the rotor, means to feather the pistons to permit them to pass through the slots in the heads, and means to shift the heads with relation to the intake and exhaust ports to reverse the direction of operation of the engine.

3. In a reversible rotary motor, a stator, webs extending transversely of the stator, said webs having openings extending transversely therethrough, a rotor, web sections carried by the periphery of the rotor to pass through the openings in the webs of the stator, relatively stationary cams carried by the stator, rotatable cams carried by the pistons and engaging the cams carried by the stator to cause said pistons to revolve, independent bearing rings supporting each set of pistons, and means to shift the webs of the stator at the intake ports, whereby the direction of rotation of the rotor is controlled.

4. In a rotary reversible motor, a stator forming an annular passage, heads formed at spaced intervals around the passage, said heads being provided with transverse openings and extending transversely of the passage, a rotor rotatable within the stator, said rotor being provided with radial apertures, pistons rotatable in said apertures, piston heads carried by the pistons and extending into the annular passage of the stator, cams controlling the movement of the pistons whereby the heads are feathered, stationary cams carried by the stator for operating the cams on the pistons, means to shift the heads at the intake port of the stator whereby the direction of rotation of the motor is controlled, and independent rings supporting the inner ends of the pistons.

5. In a reversible rotary motor, a stator provided with a plurality of stationary heads, extending transversely thereof and provided with transverse openings, a rotor within said stator having radial apertures extending therethrough, pistons rotatable in the apertures, piston heads carried by the outer ends of the pistons and adapted to coöperate with the heads in the stator, means to rotate the pistons, the heads of the stator at the intake opening being movable, means to shift said heads to reverse the direction of rotation of the motor, cams for shifting the heads of the rotor and valves controlling the exhaust from the motor.

6. In a rotary engine, a stator having an intake port and an exhaust port arranged diametrically opposite the intake port, slotted heads within the stator, a rotor, pistons carried by said rotor, means to feather the pistons to permit them to pass through the slots in the heads and means to shift the heads with relation to the ports whereby the direction of operation of the engine is reversed.

7. In a rotary engine, a stator, slotted heads in said stator, a rotor, pistons carried by said rotor, cams to feather said pistons to permit the same to pass through the slots in the heads and means to change the position of the heads and cams to reverse the direction of operation of the engine.

8. In a rotary engine, a stator, a rotor, shifting heads within the stator, said heads being slotted, a plate supporting the heads, pistons carried by the rotor, means carried by the plates to feather the pistons to allow the same to pass through the slots in the heads and means to shift the plate to reverse the direction of operation of the engine.

9. In a rotary engine, a stator, a plate rotatable with relation to the stator, the said stator having intake and exhaust ports therein, slotted heads carried by the plate and associated with the intake and exhaust ports, a rotor, pistons carried by the rotor, means carried by the plate for feathering the pistons to permit the same to pass through the slots in the heads, and means to shift the plate and heads to position the same to one side or the other side of the intake and exhaust ports, whereby the direction of operation of the engine may be controlled.

10. In a rotary engine, a stator having intake and exhaust ports arranged at diametrically opposite points, a plate, heads carried by the plate and adapted to coöperate with the intake and exhaust ports in order to control the direction of operation of the engine, a rotor, pistons carried by the rotor and adapted to pass through the slots in the heads, and cams carried by the plate for feathering the pistons.

11. In a rotary engine a stator having intake and exhaust ports arranged at diametrically opposite points, a plate head carried by the plate and adapted to coöperate with the intake and exhaust ports in order to control the direction of operation of the engine, a rotor, pistons carried by the rotor and adapted to pass through the slots in the heads, and valves carried by the plate and stationary with relation to the heads for controlling the inlet and exhaust of fluid.

In testimony whereof I affix my signature in presence of two witnesses.

GEORGE A. BERTSCH.

Witnesses:
HARRY M. HARRIS,
WILLIAM H. BROOKE.

Copies of this patent may be obtained for five cents each, by addressing the "Commissioner of Patents, Washington, D. C."